US008209456B2

United States Patent
Mandhani et al.

(10) Patent No.: US 8,209,456 B2
(45) Date of Patent: *Jun. 26, 2012

(54) INTEGRATING NON-PERIPHERAL COMPONENT INTERCONNECT (PCI) RESOURCES INTO A PERSONAL COMPUTER SYSTEM

(75) Inventors: Arvind Mandhani, San Francisco, CA (US); Woojong Han, Phoenix, AZ (US); Ken Shoemaker, Los Altos Hills, CA (US); Madhu Athreya, Saratoga, CA (US); Mahesh Wagh, Portland, OR (US); Shreekant S. Thakkar, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/180,697

(22) Filed: Jul. 12, 2011

(65) Prior Publication Data

US 2011/0271021 A1 Nov. 3, 2011

Related U.S. Application Data

(63) Continuation of application No. 12/841,889, filed on Jul. 22, 2010, now Pat. No. 8,010,731, which is a continuation of application No. 12/080,076, filed on Mar. 31, 2008, now Pat. No. 7,783,819.

(51) Int. Cl.
*G06F 13/42* (2006.01)
*G06F 13/20* (2006.01)
*G06F 13/36* (2006.01)

(52) U.S. Cl. ......... 710/313; 710/105; 710/311; 710/315

(58) Field of Classification Search .................... 710/313
See application file for complete search history.

(56) References Cited

U.S. PATENT DOCUMENTS

| | | |
|---|---|---|
| 6,009,488 A | 12/1999 | Kavipurapu |
| 6,694,380 B1 | 2/2004 | Wolrich et al. |
| 8,810,460 | 10/2004 | Kirkwood |
| 6,816,938 B2 | 11/2004 | Edara et al. |
| 6,848,057 B2 | 1/2005 | Hicok |
| 6,986,074 B2 | 1/2006 | Alia et al. |
| 7,457,905 B2 | 11/2008 | Gehman |
| 7,506,089 B2 | 3/2009 | Cho et al. |
| 2005/0177664 A1 | 8/2005 | Cho et al. |
| 2005/0289369 A1 | 12/2005 | Chung et al. |
| 2005/0289374 A1 | 12/2005 | Kim et al. |
| 2007/0067549 A1 | 3/2007 | Gehman |
| 2008/0082840 A1 | 4/2008 | Kendall et al. |
| 2008/0147858 A1 | 6/2008 | Prakash et al. |

(Continued)

OTHER PUBLICATIONS

U.S. Patent and Trademark Office, Notice of Allowance mailed Jun. 10, 2011 in U.S. Appl. No. 12/947,307.

(Continued)

*Primary Examiner* — Ryan Stiglic
(74) *Attorney, Agent, or Firm* — Trop, Pruner & Hu, P.C.

(57) ABSTRACT

In one embodiment, the present invention includes an apparatus having an adapter to communicate according to a personal computer (PC) protocol and a second protocol. A first interface coupled to the adapter is to perform address translation and ordering of transactions received from upstream of the adapter. The first interface is coupled in turn to heterogeneous resources, each of which includes an intellectual property (IP) core and a shim, where the shim is to implement a header of the PC protocol for the IP core to enable its incorporation into the apparatus without modification. Other embodiments are described and claimed.

20 Claims, 2 Drawing Sheets

U.S. PATENT DOCUMENTS

| | | |
|---|---|---|
| 2008/0235415 A1 | 9/2008 | Clark et al. |
| 2009/0235099 A1 | 9/2009 | Branover et al. |
| 2009/0249098 A1 | 10/2009 | Han |
| 2009/0300245 A1 | 12/2009 | Shoemaker |

OTHER PUBLICATIONS

U.S. Patent and Trademark Office, Office Action mailed Feb. 11, 2011 with Reply filed May 11, 2011 in U.S. Appl. No. 12/947,307.

U.S. Patent and Trademark Office, Notice of Allowance mailed Apr. 21, 2011 in U.S. Appl. No. 12/841,889.

U.S. Patent and Trademark Office, Office Action mailed Dec. 27, 2010 with Reply filed Mar. 28, 2011 in U.S. Appl. No. 12/841,889.

Sousek, et al., "PCI Express Core Integration with the OCP Bus," CAST, Inc., 2006, 15 pages.

Mentor Graphics, "PCI Express to AMBA 3 AXI Bridge IP," Mentor Graphics, Jun. 2007, 2 pages.

U.S. Patent and Trademark Office, Office Action mailed May 11, 2010 in U.S. Appl. No. 12/156,320.

Everton Carara, et al., "Communication Models in Networks-on-Chip," 2007, pp. 57-65.

U.S. Patent and Trademark Office, Notice of Allowance mailed Aug. 30, 2010 in U.S. Appl. No. 12/156,320.

Reply to Office Action mailed May 11, 2010 filed on Aug. 6, 2010 in U.S. Appl. No. 12/156,320.

U.S. Appl. No. 12/156,320, filed May 30, 2008, entitled "Providing a Peripheral Component Interconnect (PCI)-Compatible Transaction Level Protocol for a System on a Chip (SoC)," by Ken Shoemaker, et al.

U.S. Appl. No. 12/080,076, filed Mar. 31, 2008, entitled "Integrating Non-Peripheral Component Interconnect (PCI) Resources into a Personal Computer System," by Arvind Mandhani, et al.

U.S. Patent and Trademark Office, Office Action dated Nov. 13, 2009 with Reply to Office Action filed Feb. 11, 2010 in U.S. Appl. No. 12/080,076.

Sousek, et al., "PCI Express Core Integration with the OCP Bus," CAST Inc., 2006, 15 pages.

U.S. Patent and Trademark Office, Notice of Allowance mailed on Apr. 14, 2010 in U.S. Appl. No. 12/080,076.

U.S. Patent and Trademark Office, Reply to Office Action mailed Apr. 12, 2011 which filed on Jul. 6, 2011.

U.S. Appl. No. 12/089,076, filed Mar. 31, 2008, entitled "Integrating Non-Peripheral Component Interconnect (PCI) Resources into a Personal Computer System," by Arvind Mandhani, et al.

U.S. Appl. No. 12/079,185, filed Mar. 25, 2008, entitled "Power Management for a System on a Chip (SoC)," by Woojong Han, et al.

Japanese Patent Office, Office Action issued on Aug. 12, 2010 in Japanese patent application No. 2009-127455.

U.S. Patent and Trademark Office, Office Action mailed Oct. 11, 2011 and Reply filed Jan. 5, 2012 in U.S. Appl. No. 12/079,185.

INTEGRATING NON-PERIPHERAL COMPONENT INTERCONNECT (PCI) RESOURCES INTO A PERSONAL COMPUTER SYSTEM

This application is a continuation of U.S. patent application Ser. No. 12/841,889, filed Jul. 22, 2010, now U.S. Pat. No. 8,010,731 which is a continuation of U.S. patent application Ser. No. 12/080,076, filed Mar. 31, 2008, now U.S. Pat. No. 7,783,819, the content of which is hereby incorporated by reference.

BACKGROUND

Certain semiconductor architectures such as advanced extensible interface (AXI) and open core protocol (OCP)-based architectures are modular and allow for rapid proliferation by quickly adding or deleting intellectual property (IP) blocks from an existing design. The key elements that make this possible are an interconnect fabric that can be automatically generated for a given configuration, and a large ecosystem of IP blocks that all implement the same standard interface and can be seamlessly plugged into these fabrics.

Though these IP blocks (also referred to as IPs) offer a rich set of functionality, they cannot be used in a personal computer (PC) system, as they lack some key features required for peripheral component interconnect (PCI) compatibility. For example, these IPs operate at fixed addresses, precluding plug-and-play; there is no mechanism for discovery and enumeration; PCI-style ordering is not implemented; and PCI-style power management features are missing.

DETAILED DESCRIPTION

Embodiments use a technique that enables use of heterogeneous resources, such as AXI/OCP technologies, in a PC-based system such as a PCI-based system without making any changes to the IP resources themselves. Embodiments provide two very thin hardware blocks, referred to herein as a Yunit and a shim, that can be used to plug AXI/OCP IP into an auto-generated interconnect fabric to create PCI-compatible systems. As will be described below, in one embodiment a first (e.g., a north) interface of the Yunit connects to an adapter block that interfaces to a PCI-compatible bus such as a direct media interface (DMI) bus, a PCI bus, or a Peripheral Component Interconnect Express (PCIe) bus. A second (e.g., south) interface connects directly to a non-PC interconnect, such as an AXI/OCP interconnect. In various implementations, this bus may be an OCP bus.

The Yunit implements PCI enumeration by translating PCI configuration cycles into transactions that the target IP can understand. This unit also performs address translation from re-locatable PCI addresses into fixed AXI/OCP addresses and vice versa. The Yunit may further implement an ordering mechanism to satisfy a producer-consumer model (e.g., a PCI producer-consumer model).

In turn, individual IPs are connected to the interconnect via dedicated PCI shims. Each shim may implement the entire PCI header for the corresponding IP. The Yunit routes all accesses to the PCI header and the device memory space to the shim. The shim consumes all header read/write transactions and passes on other transactions to the IP. In some embodiments, the shim also implements all power management related features for the IP.

Figure 1:
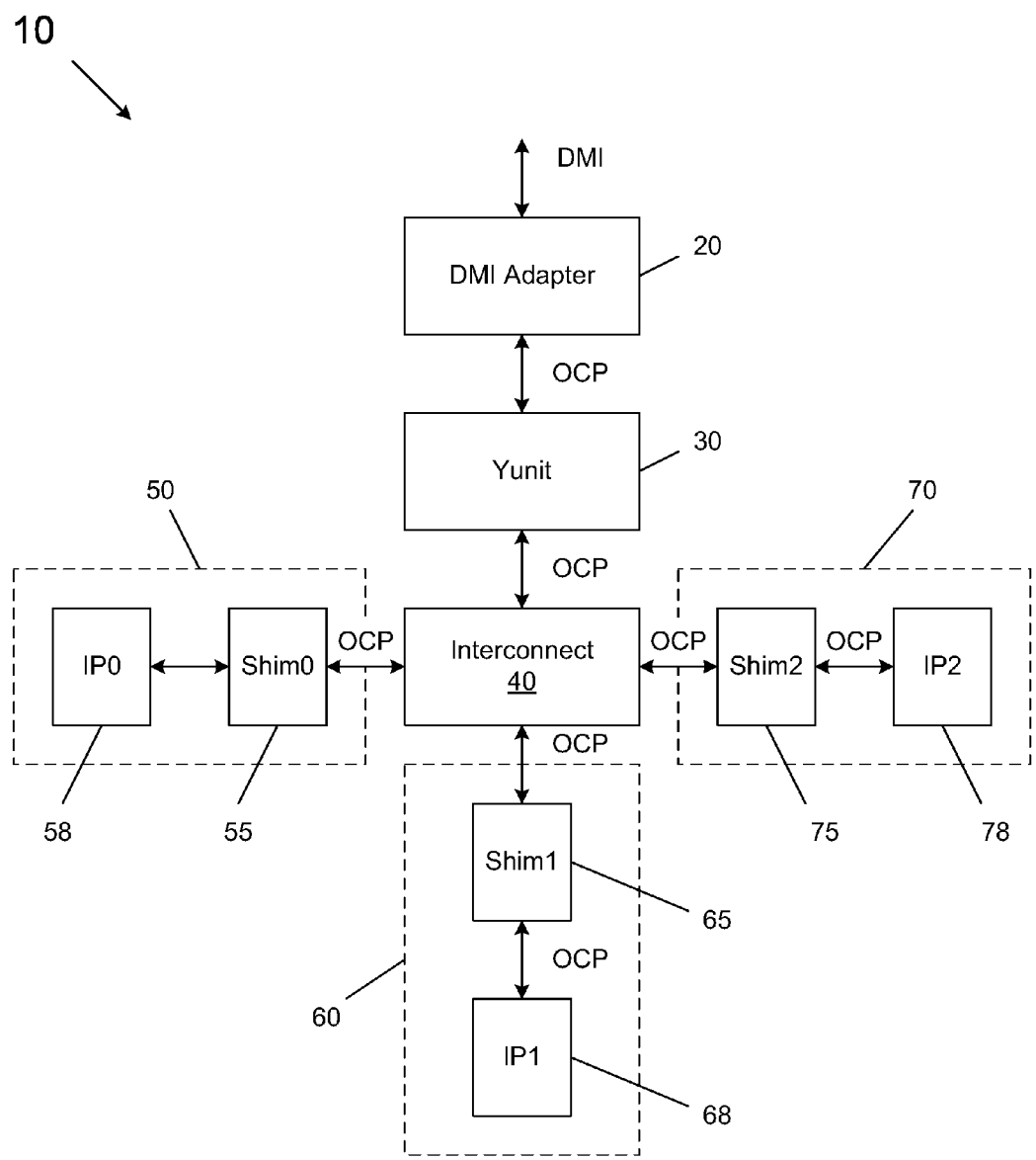
FIG. 1 is a block diagram of a processor in accordance with one embodiment of the present invention.

Referring now to FIG. 1, shown is a block diagram of a processor in accordance with one embodiment of the present invention. As shown in FIG. 1, processor 10 may be a system on a chip (SoC) or other integrated circuit that can be formed on a single semiconductor die. In the embodiment of FIG. 1, processor 10 may include various heterogeneous resources that can be coupled to an interface to provide the ability to communicate and control these various heterogeneous resources using standard PC signaling mechanisms, such as a PCI protocol, although the scope of the present invention is not limited in this regard.

As shown in FIG. 1, processor 10 may include an adapter 20 which, in one embodiment may be a DMI adapter having a first interface that can communicate according to a given protocol, e.g., a DMI protocol. However in other implementations adapter 20 may communicate using this first interface according to a PCI, PCIe or other such PC-based communication protocol. Accordingly, communications with an upstream component, which may be another part of the SoC, or a different component such as a chipset component of a PC, e.g., an input/output controller hub (ICH) may occur according to the given PC protocol, e.g., the DMI protocol shown in FIG. 1.

In turn, downstream communications can occur according to a non-PC communication protocol such as the OCP protocol shown in FIG. 1, although other implementations are certainly possible.

Adapter 20 communicates with a Yunit 30, which as described above may handle various PCI or other such PC-based operations. On its downstream side Yunit 30 may be coupled to an interconnect 40, which may provide interconnection and routing of communications between Yunit 30 and a plurality of different heterogeneous resources. In the embodiment shown in FIG. 1, such resources include a first resource 50, a second resource 60, and a third resource 70, each of which may represent a given heterogeneous resource such as a given IP block of one or more third parties. Each heterogeneous resource may be configured differently to perform one or more specialized functions.

Still referring to FIG. 1, interconnect 40 may be coupled to each resource via an interconnect, e.g., an OCP interconnect. Each resource includes a shim to connect the resource to interconnect 40. The shims may be used to perform all PCI-related operations, such that communication between the shim and the respective IP block of the resource can be by the underlying protocol of the IP block. Thus as shown in FIG. 1, resource 50 includes a shim 55 coupled to an IP block 58 by an interconnect such as an OCP-based interconnect. Similarly, resource 60 includes a shim 65 coupled to an IP block 68 by a OCP interconnect. Also shown in FIG. 1 is a resource 70 that includes a shim 75 coupled to an IP block 78 by an OCP interconnect. While shown with this particular implementation in the embodiment of FIG. 1, the scope of the present invention is not limited in this regard.

Thus, rather than being a monolithic compatibility block, embodiments that implement a Yunit take a distributed approach. Functionality that is common across all IPs, e.g., address translation and ordering, is implemented in the Yunit, while IP-specific functionality such as power management, error handling, and so forth, is implemented in the shims that are tailored to that IP.

In this way, a new IP can be added with minimal changes to the Yunit. For example, in one implementation the changes may occur by adding a new entry in an address redirection table. While the shims are IP-specific, in some implementations a large amount of the functionality (e.g., more than 90%) is common across all IPs. This enables a rapid reconfiguration of an existing shim for a new IP.

Embodiments thus also enable use of auto-generated interconnect fabrics without modification. In a point-to-point bus architecture, designing interconnect fabrics can be a challenging task. The Yunit approach described above leverages an industry ecosystem into a PCI system with minimal effort and without requiring any modifications to industry-standard tools.

Figure 2:
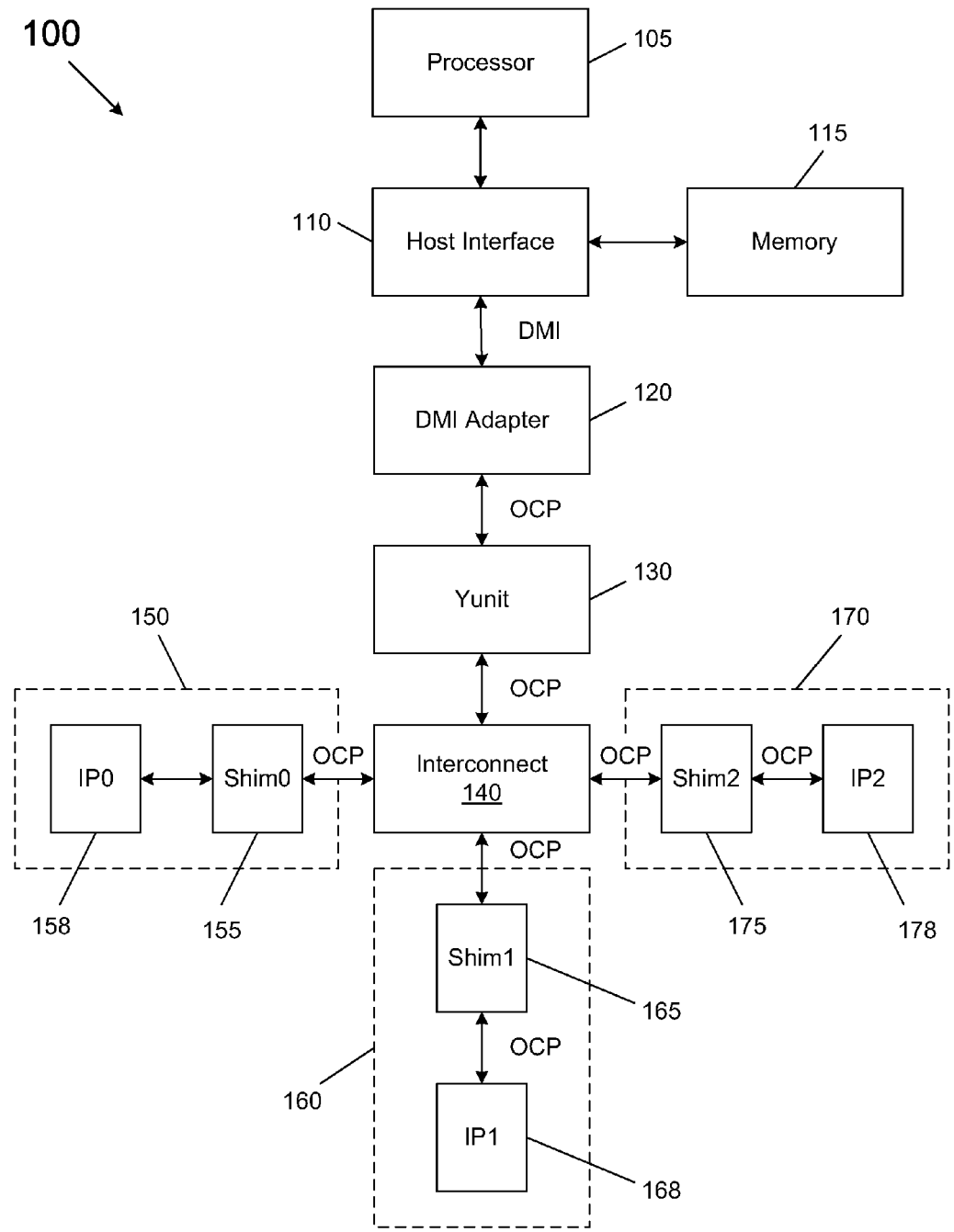
FIG. 2 is a block diagram of a system in accordance with one embodiment of the present invention.

FIG. 2 is a block diagram of a system in accordance with one embodiment of the present invention. System 100 may be a PC-based system, such as a PCI-based system that can be implemented in different form factors, from a desktop system to a laptop to an ultra-mobile PC. As shown in FIG. 2, system 100 includes a processor 105 coupled to a host interface 110, which in turn is coupled to a memory 115, such as a dynamic random access memory (DRAM), and in turn to DMI adapter 120, e.g., via a DMI bus. Processor 105 may be, in some embodiments, a low power processor that can execute a PC-based operating system (OS) such as a WINDOWS™ or LINUX™ OS that uses a PCI or other such PC protocol, although certain components of the system may be of another protocol, e.g., AXI or OCP.

Adapter 120 communicates with a Yunit 130, which as described above may handle various PCI or other such PC-based operations. On its downstream side Yunit 130 may be coupled to an interconnect 140 to provide interconnection and routing of communications between Yunit 130 and different heterogeneous resources. In the embodiment shown in FIG. 2, such resources include a first resource 150, a second resource 160, and a third resource 170, each of which may represent a given heterogeneous resource such as a given IP block of one or more third parties.

Still referring to FIG. 2, interconnect 140 may be coupled to each resource via an OCP interconnect. Each resource includes a shim to connect the resource to interconnect 140. The shims may be used to perform all PCI-related operations, such that communication between the shim and the respective IP block of the resource can be by the underlying protocol of the IP block. Thus as shown in FIG. 2, resource 150 includes a shim 155 coupled to an IP block 158 by an OCP-based interconnect. Similarly, resource 160 includes a shim 165 coupled to an IP block 168 by an OCP interconnect. Also shown in FIG. 2 is a resource 170 that includes a shim 175 coupled to an IP block 178 by an OCP interconnect. While shown with this particular implementation in the embodiment of FIG. 2, the scope of the present invention is not limited in this regard.

Embodiments may be implemented in code and may be stored on a storage medium having stored thereon instructions which can be used to program a system to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
an adapter adapted on a single semiconductor die to communicate with a processor according to a first protocol and to communicate with an interface according to a second protocol corresponding to an open core protocol (OCP) protocol;
the interface adapted on the single semiconductor die and coupled to the adapter, the interface to perform common functionality for a plurality of heterogeneous resources coupled to an interconnect; and
the interconnect adapted on the single semiconductor die to couple the interface to the plurality of heterogeneous resources, each including an intellectual property (IP) core and a shim, wherein the shim is to implement a header for the IP core, the apparatus to operate according to the first protocol and the IP core to operate according to the second protocol.

2. The apparatus of claim 1, wherein the interface is to translate configuration cycles of the first protocol into a format for the second protocol, wherein the first protocol corresponds to a peripheral component interconnect (PCI) protocol.

3. The apparatus of claim 2, wherein the interface is to perform address translation to translate a re-locatable PCI address into an OCP address.

4. The apparatus of claim 1, wherein the interface is to perform operations that are common across the plurality of heterogeneous resources, and each shim is to perform operations that are specific to the corresponding IP core.

5. The apparatus of claim 4, wherein the common operations include address translation and ordering of transactions received from the processor, and the specific operations include power management and error handling.

6. The apparatus of claim 5, wherein the ordering is to satisfy a producer-consumer model of the first protocol.

7. The apparatus of claim 1, wherein the interconnect comprises an auto-generated interconnect fabric.

8. The apparatus of claim 2, wherein the interface is to route accesses to the header to a corresponding shim, and the shim is to implement the header for the corresponding IP core, wherein the interface is to further route accesses to a device memory space to the corresponding shim.

9. The apparatus of claim 8, wherein the corresponding shim is to consume read-write operations to the header and to communicate other transactions to the corresponding IP core.

10. A system-on-chip (SoC) comprising:
a processor adapted on a semiconductor die;
a host interface adapted on the semiconductor die coupled to the processor, the host interface to couple the processor to a memory and an adapter;
the adapter coupled to the host interface to communicate according to a first protocol and to communicate with a second interface according to a second protocol;
the second interface adapted on the semiconductor die coupled to the adapter, the second interface to perform address translation and ordering of transactions received from the processor; and
an interconnect adapted on the semiconductor die to couple the second interface to a plurality of heterogeneous resources, each of the plurality of heterogeneous resources including a core and a shim, wherein the SoC is to operate according to the first protocol and the core is to operate according to the second protocol.

11. The SoC of claim 10, wherein the system comprises an ultra mobile system, wherein the processor is to execute a PC operating system using the first protocol.

12. The SoC of claim 11, wherein the second interface is to translate configuration cycles from the processor into a format for the second protocol, wherein the first protocol corresponds to a peripheral component interconnect (PCI) protocol and the second interface is to perform the address translation to translate a re-locatable PCI address into an open core protocol (OCP) address.

13. The SoC of claim 12, wherein the second interface is to perform operations that are common across the plurality of heterogeneous resources, and each shim is to perform operations that are specific to the corresponding core, the common operations including the address translation and the ordering, and the specific operations including power management and error handling.

14. The SoC of claim 10, wherein the second interface includes an address redirection table.

15. An apparatus comprising:
    an adapter to communicate with a first component according to a peripheral component interconnect (PCI)-compatible protocol and to communicate with a first interface according to an open core protocol (OCP) protocol;
    the first interface coupled to the adapter, the first interface to perform address translation and ordering of transactions received from the first component, wherein the first interface is to translate configuration cycles of the PCI-compatible protocol into a format for the OCP protocol; and
    an interconnect to couple the first interface to a plurality of heterogeneous resources, each of the plurality of heterogeneous resources including a core and a shim, wherein the apparatus is to operate according to the PCI-compatible protocol and the core is to operate according to the OCP protocol.

16. The apparatus of claim 15, wherein the first interface is to perform the address translation to translate a re-locatable PCI-compatible address into a fixed OCP address.

17. The apparatus of claim 15, wherein the first interface is to perform operations that are common across the plurality of heterogeneous resources, and each shim is to perform operations that are specific to the corresponding core.

18. The apparatus of claim 15, wherein the first component comprises a processor coupled to the adapter via a direct media interface bus.

19. The apparatus of claim 15, wherein the corresponding shim is to consume read-write operations to a PCI header for the core and to communicate other transactions to the corresponding core.

20. The apparatus of claim 15, wherein at least one of the plurality of heterogeneous resources is an intellectual property block of a third party.

* * * * *